United States Patent
Frota de Souza et al.

(10) Patent No.: US 7,959,387 B2
(45) Date of Patent: Jun. 14, 2011

(54) SHRINK FIT SLEEVE FOR TOOL HOLDER

(75) Inventors: Ruy Frota de Souza, Latrobe, PA (US); Robert E. Oshnock, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 923 days.

(21) Appl. No.: 11/866,742

(22) Filed: Oct. 3, 2007

(65) Prior Publication Data
US 2009/0091091 A1 Apr. 9, 2009

(51) Int. Cl.
*B23B 31/117* (2006.01)
(52) U.S. Cl. .................... 409/234; 279/103; 29/447
(58) Field of Classification Search ............. 408/238, 408/239 R, 239 A; 409/232, 234; 279/9.1, 279/102, 103; 29/447
See application file for complete search history.

(56) References Cited

U.S. PATENT DOCUMENTS

| | | | |
|---|---|---|---|
| 5,030,048 A | 7/1991 | Massa | |
| 5,127,780 A | 7/1992 | Massa | |
| 5,277,435 A | 1/1994 | Kraemer et al. | |
| 5,311,654 A | 5/1994 | Cook | |
| 5,553,676 A | 9/1996 | Self et al. | |
| 5,979,912 A | 11/1999 | Cook | |
| 6,048,144 A | 4/2000 | Bohler et al. | |
| 6,071,219 A | 6/2000 | Cook | |
| 6,234,729 B1 | 5/2001 | Cook | |
| 6,260,858 B1 | 7/2001 | DeLucia | |
| 6,280,126 B1 | 8/2001 | Slocum et al. | |
| 6,312,201 B1 * | 11/2001 | Nagaya et al. ............. 409/234 |
| 6,340,274 B1 * | 1/2002 | Shimomura et al. ............ 407/34 |
| 6,345,942 B1 | 2/2002 | Cook | |
| 6,394,466 B1 | 5/2002 | Matsumoto et al. | |
| 6,488,456 B1 | 12/2002 | Satran et al. | |
| 6,511,077 B1 * | 1/2003 | Voss et al. ............. 279/102 |
| 6,571,451 B2 | 6/2003 | Satran et al. | |
| 6,588,083 B2 | 7/2003 | Voss et al. | |
| 6,595,528 B2 | 7/2003 | Voss | |
| 6,701,597 B2 | 3/2004 | Voss et al. | |
| 6,871,859 B2 | 3/2005 | Lundblad et al. | |
| 6,921,402 B2 | 7/2005 | Contiliano et al. | |
| 6,991,411 B2 | 1/2006 | Irion et al. | |
| 7,137,185 B2 | 11/2006 | Voss et al. | |

(Continued)

FOREIGN PATENT DOCUMENTS

DE 199 23 164 C2 11/2000
(Continued)

OTHER PUBLICATIONS

Machine translation of JP 2004-142072, from JPO website, printed Nov. 30, 2010.* Machine translation of JP 2001-129728, from JPO website, printed on Nov. 30, 2010.*

*Primary Examiner* — Daniel W Howell
(74) *Attorney, Agent, or Firm* — Larry R. Meenan

(57) ABSTRACT

A tool holder includes a shank including a tool holder portion and a central bore for accommodating a cutting tool, and a first shrink fit sleeve disposed about the tool holder portion of the shank. An application of heat to the tool holder causes the tool holder portion and the first shrink fit sleeve to expand outwardly, and the removal of heat will cause the tool holder portion and the first shrink fit sleeve to contract inwardly to rigidly maintain the cutting tool within the tool holder by shrink fit. The tool holder may also include a second shrink fit sleeve disposed about the first shrink fit sleeve to provide increased torque capability.

14 Claims, 4 Drawing Sheets

U.S. PATENT DOCUMENTS

| | | |
|---|---|---|
| 7,157,676 B2 | 1/2007 | Steudte |
| 7,192,226 B2 | 3/2007 | Unsworth |
| 7,367,763 B2 | 5/2008 | Ruy Frota de Souza |
| 2006/0147288 A1 | 7/2006 | Oesterle |
| 2007/0140803 A1 | 6/2007 | Filho |

FOREIGN PATENT DOCUMENTS

| | | | |
|---|---|---|---|
| JP | 2001-009608 A1 | | 1/2001 |
| JP | 2001129728 A | * | 5/2001 |
| JP | 2001138163 A | * | 5/2001 |
| JP | 2004142072 A | * | 5/2004 |

* cited by examiner

SHRINK FIT SLEEVE FOR TOOL HOLDER

BACKGROUND OF THE INVENTION

It is known in the art to utilize heat shrink or shrink fit tool assemblies in industrial applications. The prior designs have utilized unitary chucks having an inner diameter slightly smaller than the exterior diameter of the shank of the cutting tool or other work piece. During use, the tool chuck is heated, typically by means of induction heating, causing the chuck to expand a sufficient amount to allow the tool shank to be inserted within the chuck. The tool is then allowed to cool during which the thermal contraction of the chuck exerts a uniform pressure on the tool shank, allowing the chuck to shrink down around the tool shank to securely lock or hold the shank in place. It has long been recognized that these types of heat shrink tool assemblies provide an improvement in accuracy and rigidity over standard milling chucks or collet chucks.

Referring now to FIG. 6, a conventional shrink fit tool holder is shown generally at 10 for detachably retaining a rotary cutting tool 14. In general, the shrink fit tool holder 10 comprises a shank or body 12 that includes a tool holder portion 12a, a flange member 12b, a tapered outer surface 12c that generally corresponds to a tapered bore of a spindle (not shown), and a central bore or aperture 12d for accommodating the cutting tool 14.

The central aperture 12d is formed to be slightly less in diameter than a shank portion 14a of the cutting tool 14. This amount depends on the nominal size and the required torque transmission capacity. In order to insert the cutting tool 14 within the tool holder 10, the tool holder portion 12a of the tool holder 10 is externally heated, for example, to a temperature of approximately 650° F. Due to the thermal expansion characteristics of the tool holder 10, the application of heat to the tool holder 10 causes the tool holder 10, and in particular, the tool holder portion 12a of the body 12 to expand resulting in the central aperture 12d enlarging or increasing in diameter a sufficient distance to allow the tool shank 14a to be inserted within the central aperture 12d. When the tool shank 14a is inserted a sufficient distance within the central aperture 12d, the external application of heat is discontinued and the tool holder 10 is allowed to cool back to ambient temperature, wherein thermal contraction causes the aperture 12d to contract and form a rigid bond between the tool holder 10 and the shank portion 14a of the cutting tool 14. As such, the cutting tool 14 is rigidly maintained within the tool holder 10 in a concentric fashion for high tolerance machining applications. To remove the cutting tool 14, heat is again applied to the tool holder 10 causing the tool holder 10, and in particular, the tool holder portion 12a to expand outwardly. As the tool holder 10 expands, the tool shank 14a can be withdrawn from within the central aperture 12d of the tool body 12.

However, the use of shrink fit tool holders for machining of high strength materials, such as in the aerospace industry, has some limitations. The maximum grip is proportional to the interference fit levels, but a maximum designed interference is limited by the temperature required to remove the tool from the tool holder. Therefore, the maximum grip is limited.

Some end mills with high helix angles may be pulled out from the tool holder during severe operating conditions, thus scrapping costly components. One solution is to use Weldon shank holders that provide high torque, but are not suitable for high speed applications.

Accordingly, there is a need for a heat shrink tool assembly that provides an increased torque transmission capability of the assembly.

BRIEF SUMMARY OF THE INVENTION

To solve these and other problems associated with conventional shrink fit or heat shrink tool holders, a tool holder comprises a shank including a tool holder portion and a central bore for accommodating a cutting tool, and a first shrink fit sleeve disposed about the tool holder portion of the shank. In one embodiment, the first shrink fit sleeve has an internal diameter less than the external diameter of the tool holder portion of the shank. In an alternate embodiment, the first shrink first sleeve has a tapered internal surface and the tool holder portion of the shank has a tapered external surface.

Upon heating of the first shrink fit sleeve the first shrink fit sleeve expands outwardly such that the shrink fit sleeve can be disposed about the tool holder portion of the shank. Upon cooling of the shrink fit sleeve the first shrink fit sleeve contracts inwardly around the tool holder portion to rigidly maintain the cutting tool within the tool holder by shrink fit. The tool holder may be a shrink fit type tool holder.

In another aspect of the invention, a tool holder comprises a shank including a tool holder portion and a central bore for accommodating a cutting tool; a first shrink fit sleeve disposed about the tool holder portion of the shank; and a second shrink fit sleeve disposed about the first shrink fit sleeve. Heat is applied to the first shrink fit sleeve and then disposed about the tool holder portion and then cooled. Next, heat is applied to the second shrink fit sleeve and then disposed about the first shrink fit sleeve and then cooled. The first shrink fit sleeve and the second shrink fit sleeve upon cooling contract inwardly to rigidly maintain the cutting tool within the tool holder by shrink fit.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 6:
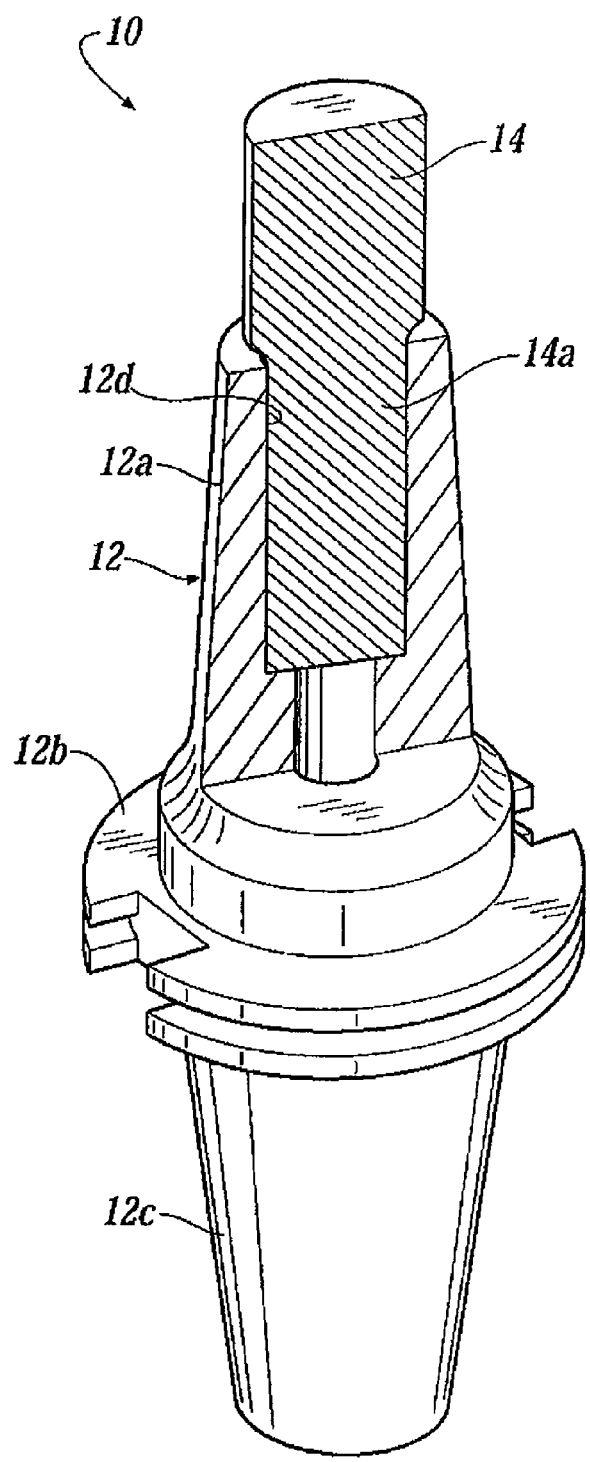
FIG. 6 is a partial cut-away perspective view of a conventional shrink fit tool holder.

As discussed above, the conventional design of FIG. 6 suffers from the lack of sufficient gripping force under severe operating conditions. One aspect of the invention is to increase the torque transmission capability of the tool holder assembly. This aspect is accomplished by providing a sleeve made of steel or other suitable material of high modulus of elasticity that can be shrink fit externally to the conventional tool holder of FIG. 6, thereby increasing the torque transmission capability of the tool holder assembly. It will be appreciated that the tool holder may be a conventional tool holder 10 or a shrink fit type tool holder 100.

As used herein, "shrink fit" means a firm fit which is effected by heating and expanding a sleeve, fitting the expanded sleeve on another member and cooling and shrinking the sleeve to fit the member firmly. The member may be the shank of tool, a tool holder or another sleeve.

Figure 1:
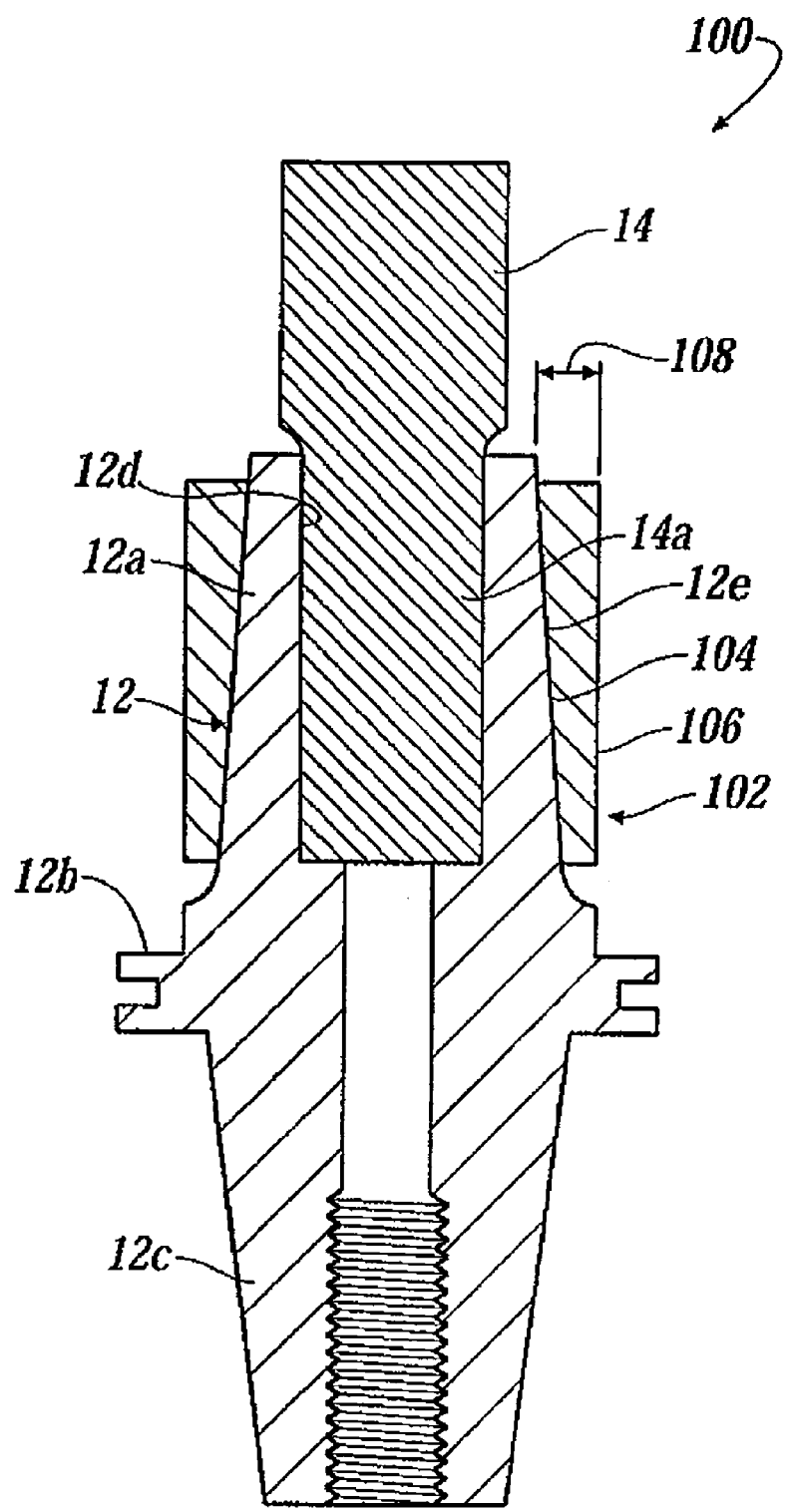
FIG. 1 is a cross-sectional view of a shrink fit tool holder with a shrink fit sleeve according to an embodiment of the invention.

Referring now to FIG. 1, a tool holder 100 is shown according to an embodiment of the invention, wherein like reference numerals are given the same designations as in FIG. 1, and thus not be described in further detail. In a preferred embodiment the tool holder 100 is a shrink fit type tool holder. The tool holder 100 differs from the conventional tool holder 10 of FIG. 6 in that the tool holder 100 includes a generally tubular shrink fit sleeve, shown generally at 102, that provides increased torque transmission capability to the tool holder 100.

The shrink fit sleeve 102 includes an inner surface 104 and an outer surface 106. The shrink fit sleeve 102 can be made of the same material as the tool body 12, or alternatively, can be made of a different material having the desired shrink fit properties. The inner surface 104 is tapered at approximately the same angle as an outer surface 12e of the tool body 12. The sleeve 102 has a varying thickness 108 such that the thickness 108 is at a maximum at a distal end with respect to the flange member 12b and is at a minimum at a proximate end with respect to the flange member 12b of the tool body 12. As a result, the outer surface 106 of the sleeve 100 is generally parallel with respect to the longitudinal axis of the tool body 12.

Figures 2, 3:
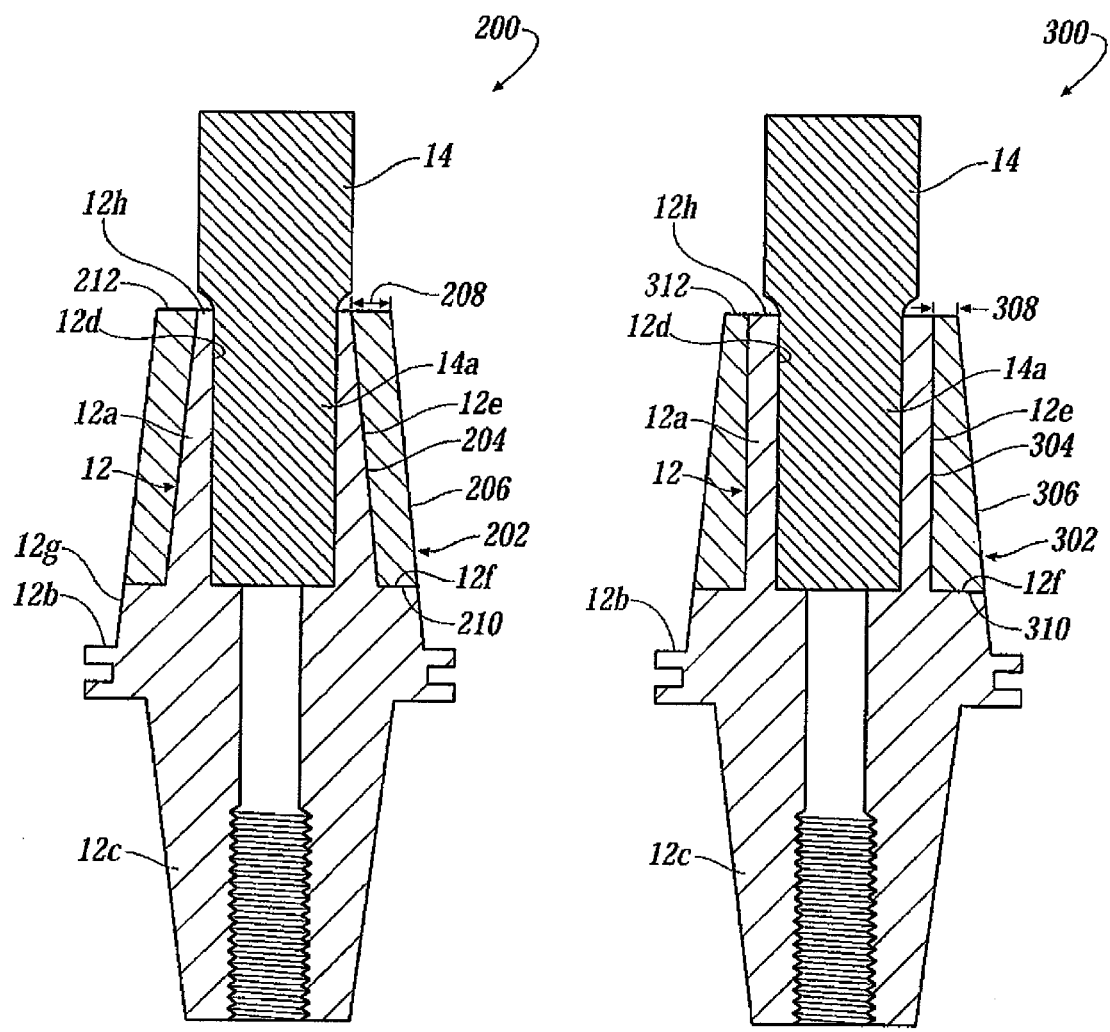
FIG. 2 is a cross-sectional view of a shrink fit tool holder with a shrink fit sleeve according to another embodiment of the invention.
FIG. 3 is a cross-sectional view of a shrink fit tool holder with a shrink fit sleeve according to yet another embodiment of the invention.

Referring now to FIG. 2, a shrink fit tool holder 200 is shown according to another embodiment of the invention. In this embodiment, the tool holder 200 includes a shrink fit sleeve 202 that includes an inner surface 204, an outer surface 206, a bottom surface 210 and a top surface 212. When positioned about the tool body 12, the outer surface 206 of the sleeve 200 provides a substantially continuous surface with an outer surface 12g of the tool body 12, and the top surface 212 is substantially continuous with a top surface 12h of the tool body 12. When the sleeve 202 is shrink fit in place with a pre-determined amount of interference, the bottom surface 210 of the sleeve 202 may or may not abut a ledge 12f of the tool body 12, thereby acting as a stop to correctly position the sleeve 202 with respect to the tool body 12. This pre-determined amount of interference depends on the amount of heat applied to the sleeve 202, the material and the dimensions of the sleeve. The abutment between the bottom surface 210 and the ledge 12f may be used as a limit to the interference fit and as to the amount of heat that should be applied to remove the sleeve 202. In this embodiment, the sleeve 200 is not tapered like the sleeve 100, but has a substantially uniform thickness 208.

Referring now to FIG. 3, a shrink fit tool holder 300 is shown according to yet another embodiment of the invention. In this embodiment, the tool holder 300 includes a shrink fit sleeve 302 that is substantially identical to the sleeve 202, except that the sleeve 302 has a varying thickness 308 such that the thickness 308 is at a minimum a distal end with respect to the flange member 12b of the tool body 12. This variation is opposite to the variation in thickness of the sleeve 100 of FIG. 1. When the sleeve 302 is shrink fit in place with a pre-determined amount of interference, it is desirable that the bottom surface 310 of the sleeve 302 abuts the ledge 12f of the tool body 12, thereby acting as a stop to correctly position the sleeve 302 with respect to the tool body 12. Because the tool holder portion 12a and the inner surface 304 of the sleeve 302 are substantially cylindrical in shape, this pre-determined amount of interference can not be controlled in the same manner as the sleeve 202 in FIG. 2, which has a tapered inner surface 204.

Figures 4, 5:
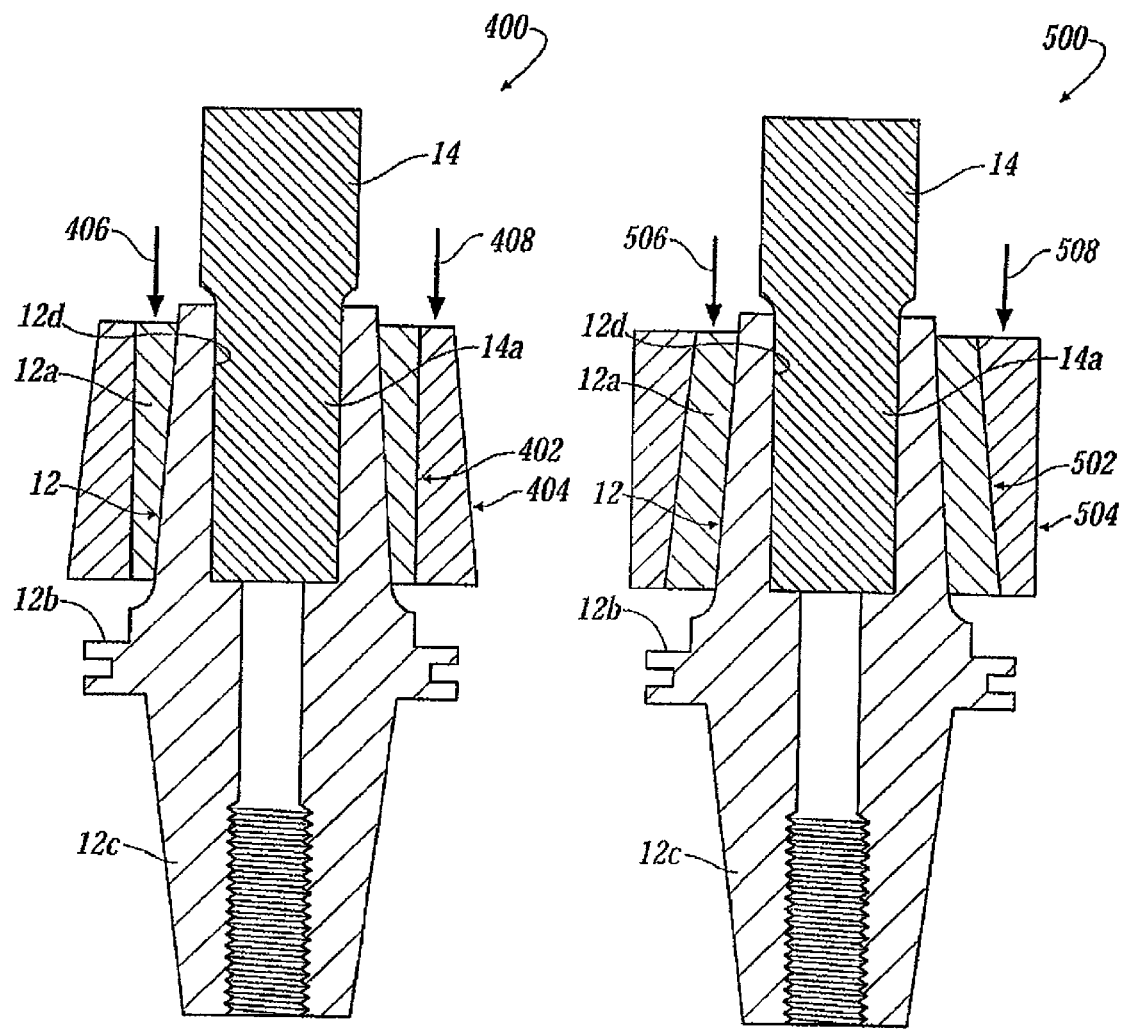
FIG. 4 is a cross-sectional view of a shrink fit tool holder with a pair of shrink fit sleeves according to an embodiment of the invention.
FIG. 5 is a cross-sectional view of a shrink fit tool holder with a pair of shrink fit sleeves according to another embodiment of the invention.

Referring now to FIG. 4, a shrink fit tool holder 400 is shown according to another embodiment of the invention. In this embodiment, the tool holder 400 includes a first shrink fit sleeve 402 and a second shrink fit sleeve 404 disposed about the first shrink fit sleeve 402. The second shrink fit sleeve 404 provides increased torque transmission capability to the shrink fit tool holder 400 as compared to the earlier embodiments. As shown in FIG. 4, the first shrink fit sleeve 402 is substantially identical to the shrink fit sleeve 102 and is assembled to the tool holder 400 in the direction of the arrow 406. That is, the sleeve 402 has a greater thickness distal to the flange member 12b of the tool body 12. By contrast, the second shrink fit sleeve 404 has a greater thickness proximate to the flange member 12b of the tool body. Thus, the second shrink fit sleeve 404 is assembled in a direction of the arrow 408.

To install the shrink fit sleeves 402, 404, the inner shrink fit sleeve 402 is first shrink fit in place and then is allowed to cool to room temperature. Then, a second shrink fit operation is performed on the outermost shrink fit sleeve 404. To remove the shrink fit sleeves 402, 404, heat is applied to the outermost shrink fit sleeve 404 to allow the sleeve 404 to expand a sufficient amount to enable the sleeve 404 to be removed from the tool holder 400. Next, heat is applied to the inner shrink fit sleeve 402 to allow the sleeve 402 to expand a sufficient amount to enable the sleeve 402 to be removed from the tool holder 400. Lastly, heat is applied to the body 12 to allow the bore 12d to expand, thereby enabling the cutting tool 14 to be removed from the tool holder 400.

Referring now to FIG. 5, a shrink fit tool holder 500 is shown according to yet another embodiment of the invention. In this embodiment, the tool holder 500 includes a first shrink fit sleeve 502 and a second shrink fit sleeve 504 disposed about the first shrink fit sleeve 502. As shown in FIG. 5, the first shrink fit sleeve 502 is substantially identical to the shrink fit sleeve 202 having a substantially uniform thickness and is assembled to the tool holder 500 in the direction of the arrow 506. The second shrink fit sleeve 504 has a greater thickness distal to the flange member 12b of the tool body, and is assembled in a direction of the arrow 508, which is in the same to the direction as the arrow 506. The installation and removal of the shrink fit sleeves 502, 504 is substantially similar to the installation and removal of the shrink fit sleeves 402, 404 described above.

Many variations of the illustrated embodiments set forth above are within the spirit and scope of the invention. For example, the tool body 12 of the tool holders 400, 500 may include a ledge similar to the ledge 12f such that the outer surface of the second shrink fit sleeve 404, 504 may be continuous with the outer surface 12g of the tool body 12, as shown in FIGS. 2 and 3. In addition, a set screw of a type well known in the art may be used to firmly secure the sleeve to the tool holder.

To assemble the tool holders of the invention, the shrink fit sleeve or sleeves are shrink fit in separate steps. First, the tool is assembled on the toolholder by applying the heat to the toolholder assembly, inserting the tool in the sleeve and then allowing the assembly to cool down. Then, heat is applied to a sleeve and then the sleeve is disposed about the tool holder portion and is then allowed to cool to collapse the sleeve on the tool holder. Additional shrink fit sleeves may be added using essentially the same sequence of steps.

In order to remove the tool, the outermost shrink fit sleeve or sleeves are removed first (heat applied to the outermost sleeve of the tool holder assembly, allowing the outermost sleeve to expand first and be removed, additional sleeves may be removed applying the same sequence of steps). Subsequently, heat is applied again on the tool holder, and then the tool is removed. This procedure provides a better distribution of stresses across the whole wall thickness and allows the tool holder to apply more pressure on the shank of the tool, as compared to conventional shrink fit tool holders.

It is noted that when using the sleeves with taper bores, the amount of interference fit that can be achieved depends on the temperature applied to the sleeve(s). The more the sleeve expands, the more it drops on the external taper of the tool holder (or the sleeve that was previously shrunk). This only works for shallow taper angles, which are self locking. As a result, there is no need to be concerned about the exact size of the taper as long as the angles match the mating surface of the inner component. However, the maximum temperature applied on the sleeve needs to be limited so that the sleeve can be properly removed.

Due to the heat that goes to the internal component, the temperature necessary to remove the sleeve (or the tool) is normally higher than the temperature used when shrink fitting the sleeve. On the cylindrical sleeve, the interference is defined by design and manufacturing tolerances so the interference does not change with temperature, but tighter tolerances may be required.

The shrink fit sleeve of the invention can be applied to a wide variety of different tool holder designs. For example, the shrink fit sleeve can be applied to a Weldon style shank design that is popularly used in end mills for severe operating conditions. However, in a Weldon style shank design, the inside corner of the flat in the Weldon design can act as a stress riser that might result in possible cracking or failure of the end mill shank. In addition, the sharp points on the side of the Weldon flat and the shank outer diameter can also cause scratching and marring of the central bore or aperture 12d.

To alleviate these and other problems associated with using a Weldon style shank design, a shallow relief groove can be provided on the inner surface 104 of the shrink fit sleeve 102 (as well as the other embodiments of the shrink fit sleeve). The shallow relief groove prevents the otherwise desirable extra holding force created by the shrink fit sleeve from acting on the Weldon flat, thereby relieving the stress in the Weldon flat.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A tool holder, comprising:
   a shank including a tool holder portion and a central bore for accommodating a cutting tool;
   a first shrink fit sleeve disposed about the tool holder portion of the shank; and
   a second shrink fit sleeve disposed about the first shrink fit sleeve.

2. The tool holder of claim 1 wherein upon heating of the first shrink fit sleeve the first shrink fit sleeve expands outwardly such that the shrink fit sleeve can be disposed about the tool holder portion of the shank, and wherein upon cooling of the shrink fit sleeve the first shrink fit sleeve contracts inwardly around the tool holder portion to rigidly maintain the cutting tool within the tool holder by shrink fit.

3. The tool holder of claim 2 wherein the first shrink fit sleeve has an internal diameter less than the external diameter of the tool holder portion of the shank.

4. The tool holder of claim 2 wherein the first shrink fit sleeve has a tapered internal surface and the tool holder portion of the shank has a tapered external surface.

5. The tool holder of claim 1 wherein the tool holder portion is a shrink fit too holder portion.

6. The tool holder of claim 1, wherein the tool body includes a ledge, and wherein the first shrink fit sleeve is adapted to abut the ledge of the tool body when disposed about the tool body.

7. The tool holder of claim 1, wherein an outer surface of the first shrink fit sleeve is substantially continuous with an outer surface of the tool body.

8. The tool holder of claim 1, wherein the first shrink fit sleeve has a substantially uniform thickness.

9. The tool holder of claim 1, wherein the first shrink fit sleeve has a varying thickness.

10. The tool holder of claim 9, wherein the thickness of the first shrink fit sleeve is a maximum distal to a flange of the tool body.

11. The tool holder of claim 9, wherein the thickness of the first shrink fit sleeve is a minimum distal to a flange of the tool body.

12. The tool holder of claim 1, wherein the second shrink fit sleeve has a substantially uniform thickness.

13. The tool holder of claim 1, wherein the second shrink fit sleeve has a varying thickness.

14. A method of assembling a tool holder, comprising the steps of:
   inserting a cutting tool into a shank of a tool holder portion of a tool holder assembly;
   applying heat to a tool holder assembly;
   allowing the tool holder assembly to cool down;
   disposing a first shrink fit sleeve about the tool holder portion;
   disposing a second shrink fit sleeve about the first shrink fit sleeve;
   applying heat to the first shrink fit sleeve;
   allowing the first shrink fit sleeve to cool down;
   applying heat to the second shrink fit sleeve; and
   allowing the second shrink fit sleeve to cool down.

* * * * *